United States Patent [19]
Bundy

[11] 3,921,538
[45] Nov. 25, 1975

[54] SUPPORT STRUCTURE FOR TRANSPORTING UNCRATED LADING

[75] Inventor: Albert J. Bundy, Kingsport, Tenn.

[73] Assignee: ASG Industries, Inc., Kingsport, Tenn.

[22] Filed: Aug. 16, 1974

[21] Appl. No.: 498,028

[52] U.S. Cl............. 105/367; 206/449; 214/10.5 R
[51] Int. Cl.²........................................... B61D 3/16
[58] Field of Search................... 105/367, 486, 488; 211/49 R, 60 A, 72; 214/10.5 R; 206/449, 454

[56] References Cited
UNITED STATES PATENTS

| | | | |
|---|---|---|---|
| 1,616,605 | 2/1927 | Campbell | 105/367 |
| 1,827,322 | 10/1931 | Linderman | 105/367 |
| 1,879,513 | 9/1932 | Rothholz | 105/367 |
| 1,926,551 | 9/1933 | Miller | 105/367 |
| 2,169,677 | 8/1939 | Burrell | 105/367 |
| 2,940,402 | 6/1960 | Hansen et al. | 105/367 |
| 3,494,301 | 2/1970 | Sause | 105/486 |
| 3,809,234 | 5/1974 | Kurick | 105/367 X |

*Primary Examiner*—Robert R. Song
*Assistant Examiner*—Gene A. Church
*Attorney, Agent, or Firm*—Pennie & Edmonds

[57] ABSTRACT

A structure for supporting and restraining uncrated lading during transit is disclosed. The structure is particularly adapted for supporting and restraining in juxtaposed relation a plurality of packs each containing a plurality of individual sheets of glass or "lights". The structure includes one or more stationary cushioned frames for supporting or cradling the lading in generally upright disposition and retainer members or bars arranged either in substantially vertical or horizontal orientation and cooperable with the frame for restraining lateral movement of the lading away from the frame. The structure also includes a pair of yoke constructions cooperable with each frame. The yoke constructions are disposed adjacent to the ends of the frame and include a pair of equalizing yokes for restraining endwise movement of the lading. The equalizing yokes engage the ends of the lading and function to equalize shock impact which otherwise would be localized at a point on the lading. The yoke construction is capable of absorption of shock impact by the capability of undergoing slight rotational movement thereby restraining the lading in a non-rigid fashion.

5 Claims, 9 Drawing Figures

SUPPORT STRUCTURE FOR TRANSPORTING UNCRATED LADING

BACKGROUND OF THE INVENTION

In the prior art individual units, each including a plurality of sheets of glass or "lights", were packed or crated in order to afford as best as possible protection from damage occuring during transit by rail or by other convenient forms of transportation. The methods of and apparatus and means for crating the units of glass are well-known to those in the art. What also is well-known to those in the art is the expense involved not only in crating of material but also the expense of labor which is utilized in the crating operation. The uncrating of the product and the disposal of material of crating is also recognized as an expense. These expenses add unnecessarily to the cost of the product to the ultimate consumer.

Nevertheless it has been accepted practice to crate glass products of the type contemplated herein. The reason for this is that prior to this invention no acceptable means or method of transporting the glass product in an unpacked or uncrated fashion whereby breakage could be kept to a minimum was known. Thus, the expense involved in the packing or crating of the product was considered necessary and an alternative to the expenses otherwise experienced in the replacement of broken product.

BRIEF DESCRIPTION OF THE INVENTION

The present invention which may be adapted for the support of various types and construction of lading is directed to and concerns this problem in the glass industry. In solution and as an important aspect the present invention provides a unique supporting structure including a frame and spaced apart yoke constructions which support an equalizing yoke. The structure particularly is adapted for use with a railway car. The structure is capable of receiving as lading one or more upstanding units or racks including a plurality of lights in each of several packs and of restraining the same against both lateral and longitudinal movement, as will be brought out below.

The lights conventionally may be separated one from the other by interleaving material of a type and form as is well known. Any process of interleaving may be used. Each of the lights are contemplated as being of large size and substantial weight. Accordingly, the lights are grouped into a pack which is of a manageable weight to facilitate loading on and unloading from the frame. Each of the packs may be separated by suitable spacers of building board or Insulboard disposed at locations across the width of the lights. Loading and unloading of the individual packs may be accomplished by a suitable grapple or sling technique. The frame portion of the structure supports the lights against side-to-side or lateral movement during transit. The yoke construction portion of the structure supports the lights against end-to-end or longitudinal movement during transit. The thrust at each end of the rack of lights is distributed evenly to the railway car structure through equalizing yokes carried by the yoke constructions which cooperate with and bear upon the end of the lights. The bearing points are located at approximately the quarter points of the vertical edges. Thus, any unequal end thrust is prevented from being applied unequally to either the upper or lower thrust members and localized pressure which otherwise might damage the glass is avoided.

As a second aspect the present invention provides a pair of frames and a pair of yoke constructions for each frame. To this end a yoke construction is disposed at the opposite ends of the railway car bounding the frames while a further yoke construction having dual capability or a pair of yoke constructions are disposed between the frames. The equalizing yokes supported by the center yoke constructions remain in place during loading and unloading, so that the lights may be brought to a position to bear against their thrust members upon loading. The equalizing yokes of the end yoke constructions are removable to permit loading and unloading of the lights.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may be readily utilized as a basis for the designing of other structures for carrying out the several purposes of the invention. It is important, therefore, that the claims be regarded as including such equivalent construction as do not depart from the spirit and scope of the invention.

DESCRIPTION OF THE PREFERRED EMBODIMENT

The lading supporting and restraining structure (hereinafter referred to as "the structure") of the present invention may be mounted in various types of carriers. As previously discussed, a particular application or use of the structure is in the transport of lading composed of racks of glass, each rack including a plurality of packs formed by a plurality of individual lights by common carrier in, for example, a railway car. As illustrated in the figures, a railway car 10 having a flat bed or deck 12, upstanding side and end walls (shown in phantom) and a top enclosing wall (not shown) carries the structure, the construction and operation of which is more particularly discussed below. The railway car, unless described otherwise, may be considered conventional. Therefore, discussion, unless for the purpose of supplementing the discussion of the present invention, is considered unnecessary.

The structure includes a plurality of yoke constructions 14, 16 and 18. The yoke constructions 14 and 16 are mounted on the deck at opposite ends of the railway car. The yoke construction 18 is mounted on the deck intermediate the end yoke constructions. Each of the yoke constructions is adapted to cooperate with and bear against the ends of the individual lights of each pack forming the rack (hereinafter referred to as "lading"). To this end, through a capability of movement of at least one equalizing yoke of the pairs of yoke constructions 14 and 18 as well as 16 and 18 end thrust at each end of the lading is distributed evenly to the carrier. The distribution of thrust is through bearing members cooperative with the lading at substantially equidistantly spaced locations from the center line of the lading. Any unequal end thrust imparted by the lading during transit as localized pressure which may result in damage to the lading will be equalized across the thrust members. This action is achieved by the capability of the equalizing yokes undergoing a degree of rotational movement or floating about a fulcrum point. The movement of the equalizing yokes permits shipment of the uncrated lading under normal circumstances without breakage.

The structure also includes a frame which is mounted stationarily to the deck for cooperation with each pair of yoke constructions. Thus, the frame 20 cooperates with yoke construction pairs 14 and 18, while frame 22 cooperates with yoke construction pairs 16 and 18. Each frame is fixed on the deck 12 and disposed along the sides of the railway car for cooperation with the respective yoke construction pair. Both of the frames are of like construction. The frames serve to cradle the lading in the lateral direction, the longitudinal axis of railway car 10 being a reference to direction.

Figure 4:
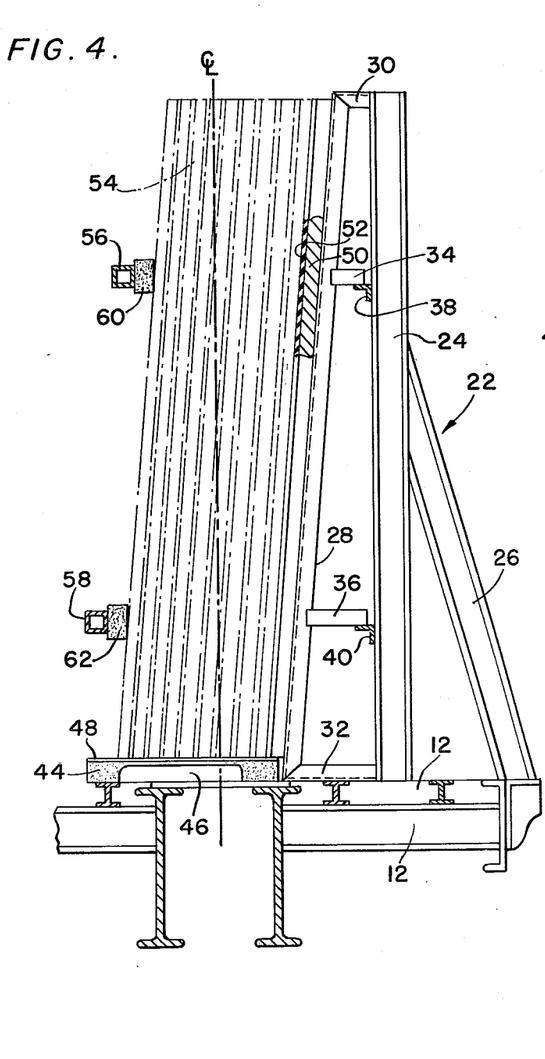
FIG. 4 is a vertical section as seen along the line 4—4 in FIG. 1.

Frame 22 (frame 20 of like construction will not be described) may be seen to advantage in FIG. 4. The frame includes a plurality of posts 24 suitably mounted at one end to the deck. A brace 26, likewise is mounted to the deck and cooperates with each post 24 between its ends to support it in a substantially vertical position. The individual posts of each frame are substantially equidistantly spaced between the yoke constructions 16 and 18. It has been found that a plurality of three posts are sufficient to support the lading, each rack of which may comprise approximately 81 lights (9 packs of 9 lights per pack) having a cross-section of approximately 10 feet × 20 feet, and weighing on the order of 50,000 pounds. Each brace is connected to the respective post by any method or means which is suitable. Thus, the braces 26 may be welded to the posts 24. Each of the posts and braces may be of I-beam construction for increased strength capability.

A plurality of rear support members 28, one for each post, are disposed on the side of the posts opposite the braces and are inclined toward each post in A-frame fashion. The members 28 may be in the form generally of a U-shaped channel. The channel is directed toward the posts. An upper spacer 30 and a lower spacer 32 which may be integral with or connected to the several members 28 serve to mount the respective members to the posts 24 and to the deck 12. Each member is inclined toward the respective post at an angle of inclination of about 4°.

As illustrated in FIG. 4, the lading is inclined at the same angle. The orientation of each frame is such that the center of mass of lading is located substantially along the center line of the railway car 10.

A pair of bars 34 and 36 stabilize the members 28 at locations along their length. The retaining bars are immovably carried by an upper angle bracket 38 and a lower angle bracket 40 on each post and extend horizontally of the posts. The retaining bars are connected to the members at spaced locations to provide maximum stability for lading support.

The frame 22 also includes at least a pair of blocks 42 and 44 which provide foot support for the lading. The blocks may be received within a channel member 46 carried by the deck 12. The blocks are of elongated form and directed across the deck toward the side of the car opposite the frame. Preferably the blocks extend from a position adjacent the base of the posts 24 to a position beyond the position on the deck to which a maximum load of the lading extends. The blocks are illustrated as disposed for support of lading within the vicinity of the ends of the frame, and particularly at dispositions corresponding to the disposition of the end posts 24. However, it is also contemplated that further blocks or idler blocks be included to provide foot support within other regions of the deck. The idler blocks may be located in proximity to the end blocks. Each block is formed of a generally rigid body. The block may be formed of wood, for example. The upper surface of the block throughout its length preferably is covered with deformable material 48 to provide a cushioning effect to assist in the absorption of shock which might otherwise be transmitted to the lading supported thereon. The deformable material may be formed of rubber impregnated with cotton fibers in canvas belting. The belting may be on the order of approximately ½ inch in thickness.

A block 50 is carried on and along each of the members 28. Each block 50 is covered with a layer of rubber impregnated canvas belting 52 in a manner similar to blocks 42 and 44 and for the same purpose.

The lading may be moved to a position within the railway car onto the frame 22 by means of a grapple and sling arrangement, as discussed. For ease in positioning the lading on each frame the railway car is formed with at least one but preferably two covers which may be removed from the stationary portion of the railway car to close and to open up the interior. The covers include a portion of the top and one side wall of the railway car.

Figure 1:
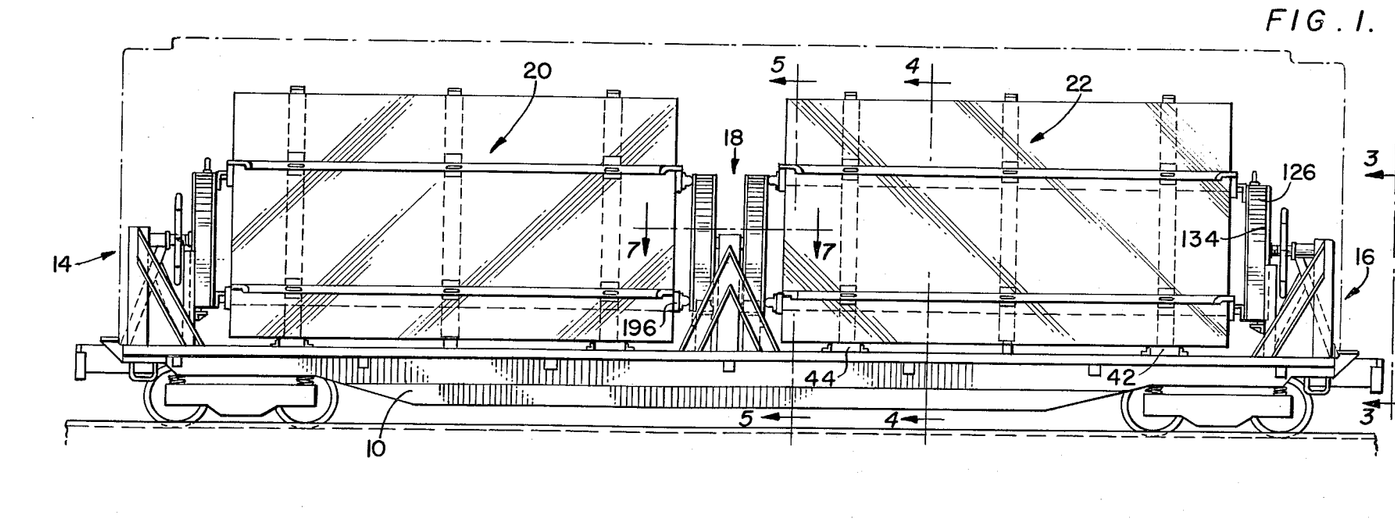
FIG. 1 is a view in side elevation of a carrier with the enclosing wall portion depicted in phantom to illustrate with clarity the lading supporting and restraining structure of the invention.

Once the lading is received by the frame 22 (and frame 20) means for lateral securement of the lading relative to the frame is moved into position. One form of lateral securement may be seen in FIGS. 1 and 4. This form of means of lateral securement is defined by a pair of bars 56 and 58 which are disposed across the face of the lading and secured at opposite ends to the frame 22. The respective bars carry a block 60 and 62 substantially along their length. Each block 60 and 62 is formed in a manner similar to the block 44, for example, and similarly carries a compressible layer of belting (not shown) for cushioning. In a manner as will be discussed in connection with FIG. 9, the blocks 60 and 62 may be replaced by a plurality of rectangular channel members at substantially equally spacing across and having their leg portions welded or otherwise secured to the bars 56 and 58. A compressible pad formed as the belting may be carried by the base of the channel adjacent to the lading.

Figure 5:
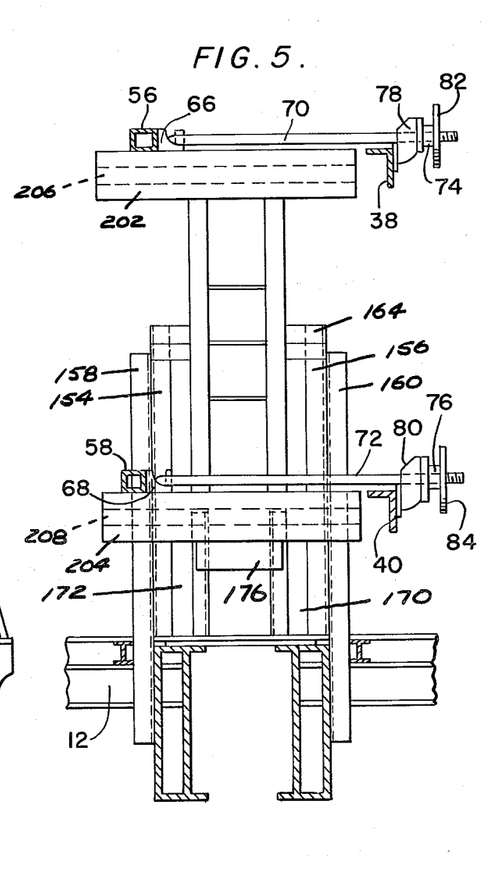
FIG. 5 is a vertical section as seen along the line 5—5 in FIG. 1.
Figure 9:
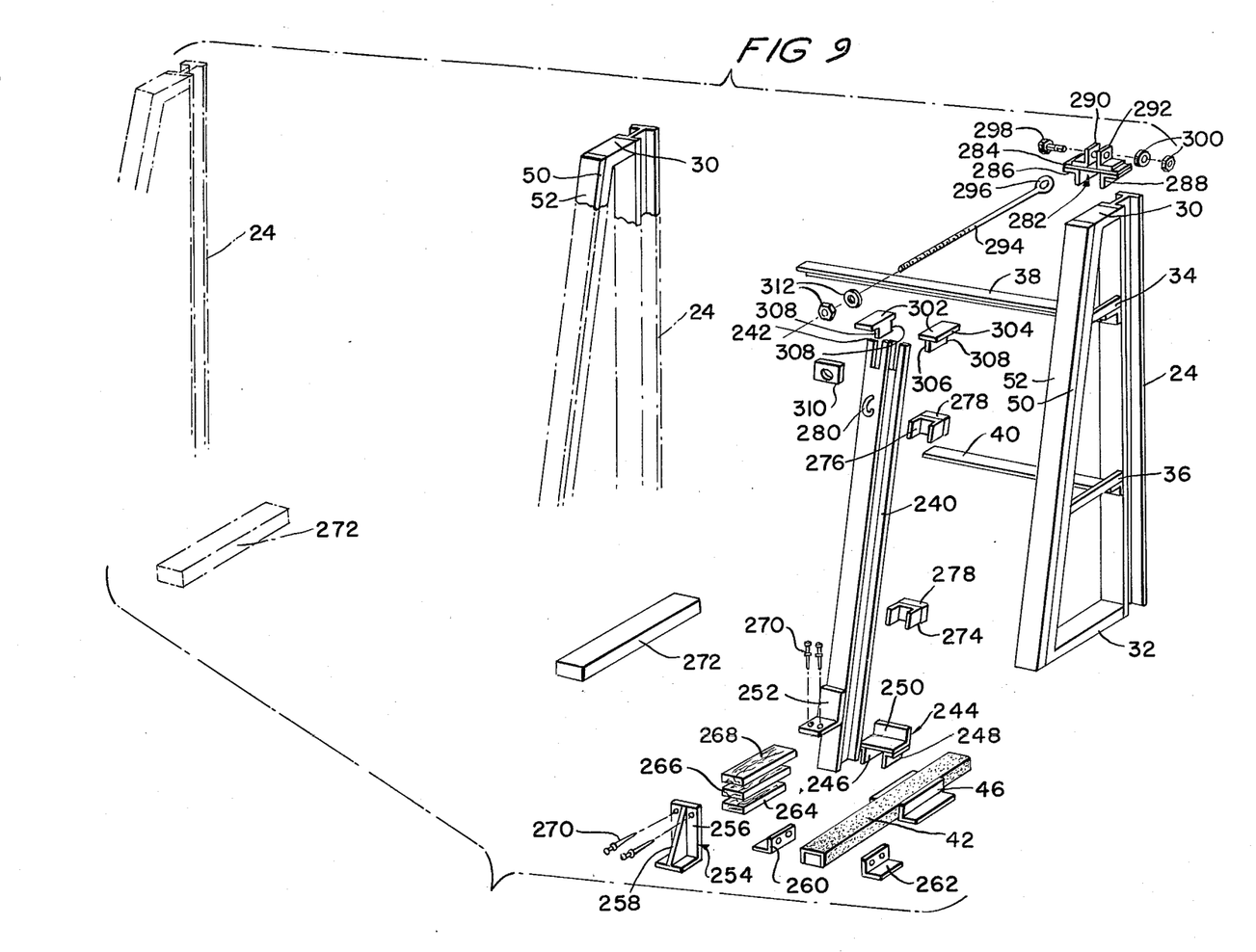
FIG. 9 is a partial perspective and exploded view of a further form of lateral securing means for lading on the frame.

The bars on the front side of the lading are longer than the length of the lading for purposes of securement. The bars carry a hook unit 66 and 68, respectively (See FIG. 5), terminating rearwardly in an upwardly directed finger. The angle brackets 38 and 40 are of a length substantially equal to the length of the restraining bars. Draw bolts 70 and 72 including an eye at one end and a threaded length at the other end provides securement for the bars. To this end, the eye of each draw bolt is received by the finger of the hook unit and tightened down by means of nuts 74 and 76 movable into engagement with fixed brackets 78 and 80. Handles 82 and 84 may be used for this purpose. A further and preferred form of lateral securement of the lading is illustrated in FIG. 9 and will be discussed below.

Figure 3:
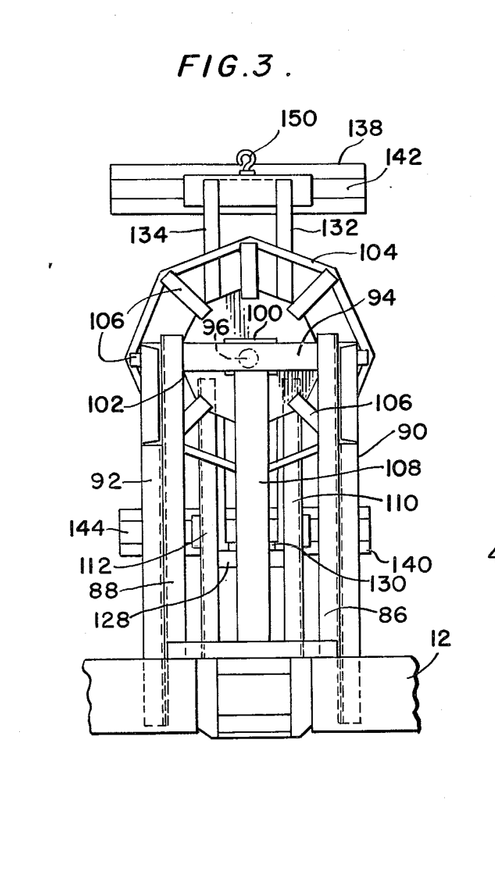
FIG. 3 is an end elevation as seen along the line 3—3 in FIG. 1.
Figure 8:
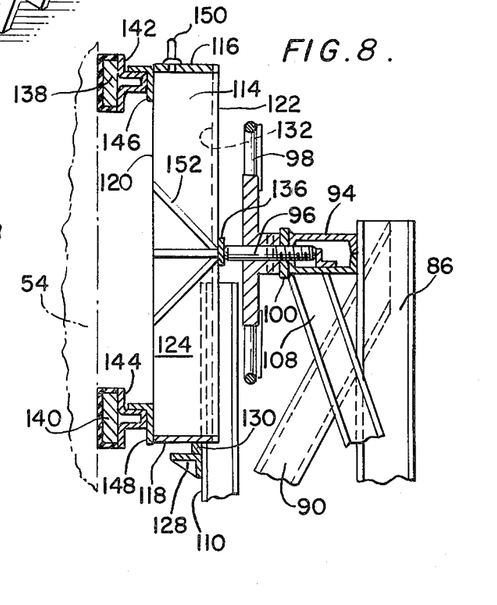
FIG. 8 is a vertical section as seen along the line 8—8 in FIG. 2.

The pairs of yoke constructions 14 and 18 as well as 16 and 18 have capability of end adjustment and provide equalization of pressure forces. The yoke constructions 14 and 16 are identical in structure and operation. Therefore, the following discussion will be directed to one of the yoke constructions, for example, yoke construction 16, as best illustrated in FIGS. 3 and 8.

The yoke construction includes a pair of posts 86 and 88 which are spaced apart toward the sides of the railway car. A pair of braces 90 and 92 are mounted to and support the posts in generally a vertical orientation. Each of the posts and braces are formed of channel members and constitute the mount for the adjustment assembly of the yoke construction 16. The assembly includes a housing 94 which is fixed by any suitable means to the side flanges of the posts 86 and 88. The housing is of rectangular box outline in cross-section. A threaded opening is located centrally in the housing on the side opposite to the posts 86 and 88. A bolt 96 is received by the housing. By means of a threaded length at a first end of the shank the bolt is adapted for movement in relation to the housing. A wheel 98 is suitably mounted on the bolt between its ends. Mounting may be accomplished by conventional keyway structure or other means so that rotation of the wheel is translated to linear movement of the bolt. A collar 100 is carried between the hub of the wheel and the housing. The wheel is formed by a central disc member 102, an outer annular grip 104 and a plurality of spokes 106 radiating from the disc to support the grip.

A brace 108 is provided to stabilize the underside of the housing 94. To this end, the brace is rigidly secured to the deck 12 (the posts 86 and 88 and braces 90 and 92 are similarly secured) and directed diagonally toward for securement to the underside of the housing. The brace 108 may be of I-beam form.

A further pair of spaced posts 110 and 112 are disposed below the second or other end of bolt 96. The posts extend from a fixed mounting on the deck 12 substantially vertically upwardly and terminate at a height substantially below the horizontal plane including the axis of the bolt 96. The posts are of channel form and each channel is directed toward the other channel. A floating equalizing yoke 114 is received by the channeled posts for horizontal movement in the direction of movement of the bolt. The equalizing yoke is also capable of pivotal movement in a plane about a bearing or fulcrum point now to be described.

Referring to FIG. 8, the equalizing yoke includes a rectangular body having a top, bottom, forward, rearward, and side surfaces 116, 118, 120 . . . and 126, respectively. The equalizing yoke is received between the posts 110 and 112, supported by the channels and adapted for movement. To this end, end angle bracket 128 is carried by the channels 110 and 112. The bracket is disposed generally horizontally of the deck 12 and, in turn, supports a block 130. Block 130 duplicates and is covered in a manner similar to and for the purposes of the covering on other blocks such as block 60. A pair of outward flanges 132 and 134 are provided along the length of the equalizing yoke 114 at the junction of the rearward and side surfaces. The equalizing yoke is received by the channels in a manner such that the flanges 132 and 134 cooperate with the channels 110 and 112 for movement within while limited by the sides of the channel. The equalizing yoke is supported by the block 130 on angle bracket 118.

A plate 136 is carried by the rearward surface 122 of the equalizing yoke 114. The plate serves as a bearing surface for the bolt 96 so that movement of the bolt through rotation of wheel 98 will impart movement to the equalizing yoke. The plate and bolt also cooperate to provide a fulcrum point for pivotal movement of the equalizing yoke. The limits of movement of the equalizing yoke are limited by the spacing between the flanges and the height of the posts 110 and 112 or spacing from the fulcrum point. To this end, the equalizing yoke may move horizontally through a distance substantially equal to this spacing and rotationally about the fulcrum point through an angle limited by the interaction of the posts and the flanges 132 and 134 of the equalizing yoke.

Figure 2:
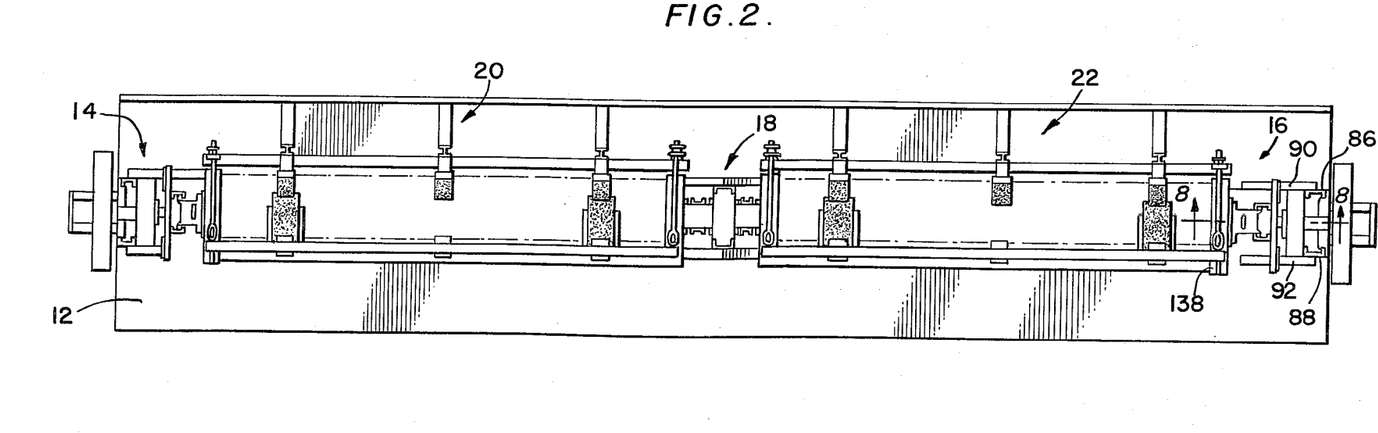
FIG. 2 is a top plan view of the structure of FIG. 1.

A pair of blocks 138 and 140 are carried by the equalizing yoke. The blocks are mounted by brackets 142 and 144 which, in turn, are mounted by angle brackets 146 and 148. The several brackets serve to rigidly secure the blocks to the equalizing yoke. Each block is elongated in length, as best seen in FIG. 2. The blocks are formed similarly and provide the function of the blocks heretofore discussed. To this end, the blocks include a rubber impregnated belting on the side adjacent to the lading 54.

The equalizing yoke includes an eye 150 for cooperation with hoisting equipment. The equalizing yoke may be received by the posts 110 and 112 after placement of the lading and moved into abutting relation therewith. After transit the equalizing yoke may be removed for ease in removal of the lading. A plurality of struts 152 project generally outwardly from the region of the plate 136 for the purpose of supporting the walls of the equalizing yoke against the forces exerted by the bolt 96 and the lading 54 in the region of blocks 138 and 140.

The yoke construction 18 basically duplicates the structure described in relation to the yoke construction 16. Yoke construction 18, however, provides a pair of equalizing yokes, one of which cooperates with the equalizing yoke of yoke construction 14, while the other cooperates with the equalizing yoke of yoke construction 16. Yoke construction 18 may be seen to best advantage in FIGS. 6 and 7.

Figure 6:
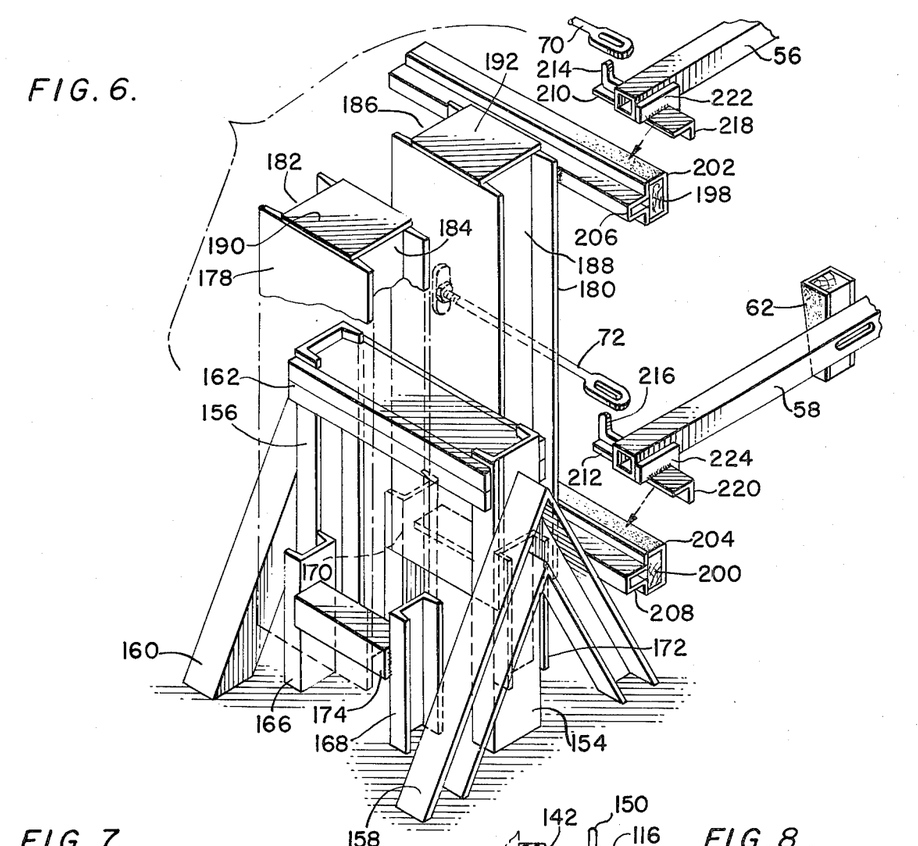
FIG. 6 is an enlarged perspective view of the centrally located yoke construction and the opposed equalizing yokes.
Figure 7:
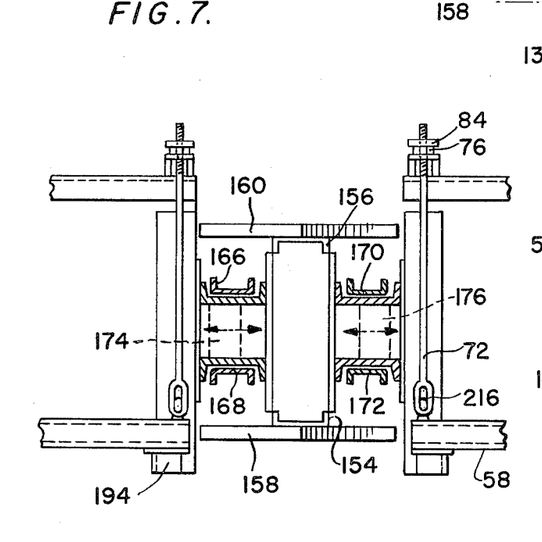
FIG. 7 is a horizontal section as seen along the line 7—7 in FIG. 1.

The yoke construction 18 is disposed centrally of the yoke constructions 14 and 16. The yoke construction includes a pair of spaced posts 154 and 156 which are rigidly mounted on the deck 12 and braced in a vertical orientation by a pair of A-frame members 158 and 160.

A pair of blocks 162 and 164 are secured to the opposite sides of the posts 154 and 156 adjacent the ends and span the distance between the posts. The blocks function as bearing members for the equalizing yokes, to be described. Each of the posts and A-frame members are channel shape and disposed with their flat sides in abutting relation for suitable connection.

A pair of posts 166 and 168 are disposed on the side of the posts 154 and 156 toward yoke construction 14; a further pair of like posts 170 and 172 are disposed on the other side of posts 154 and 156 toward yoke construction 16. Both pairs of side posts are spaced apart by a distance less than the spacing of the posts 154 and 156. Each of the side posts in each pair are channel shaped with the channel side directed outwardly. Webs 174 and 176 are mounted by and between the posts of each pair. The webs have a flat upper surface for the purpose of providing a support for a pair of floating yokes 178 and 180. As may be appreciated the end post and the webs duplicate the posts 110 and 112 of yoke construction 16 in construction and substantially both disposition on and height above the deck, and angle bracket 118 secured thereto.

Each of the equalizing yokes 178 and 180 are formed by a pair of oppositely directed channel members 182 and 184 (and 186 and 188) which are secured together by a top plate 190 (and 192) and a bottom plate (not shown).

The equalizing yokes 178 and 180 are disposed in a manner such that they rest on the webs 174 and 176 between the pairs of spaced end posts 166 and 168, and 170 and 172. The equalizing yokes have vertical height equal to approximately twice the distance between the surface of the webs 174 and 176 and the center line of the bearing blocks 162 and 164. Each equalizing yoke is capable of straight line movement in the horizontal direction and of pivotal movement about a fulcrum formed at the bearing blocks. Movement of the equalizing yokes is limited by the amount of clearance between the sides of channels 166 and 168, 170 and 172 and the channel sides of the equalizing yokes themselves. The equalizing yokes are capable of pivoting as discussed about their central region and the fulcrum formed by the plates 162 and 164. Less restraint to pivotal movement during equalization of load is introduced if the webs 174 and 176 between the pairs of posts 166 and 168 and posts 170 and 172 are offset slightly (See FIG. 6).

Pairs of elongated blocks 194 and 196, and 198 and 200 are carried by the equalizing yoke 178 and 180, respectively. The blocks are similar in form to the blocks 138 and 140, and also are similarly covered by rubber impregnated belting. The coverings 202 and 204 may be seen in FIG. 6. Each of the blocks are supported in a manner similar to the support of block 138, for example. Thus, the several blocks are secured to a bracket, such as the brackets 206 and 208, the brackets being mounted to the equalizing yokes 178 and 180 in the region of their ends. The brackets span between the side posts in disposition substantially parallel to the deck 12.

The lading 54 is moved to and located within the railway car by any suitable means for receipt on the frames 20 and 22. Preferably the lading will be located to abut the equalizing yokes, particularly the pair of blocks 194 and 196 as well as the pair of blocks 198 and 200, moving the equalizing yokes to the disposition of FIG. 7. Thus, the equalizing yokes are moved to contact the fulcrum blocks 162 and 164 yet providing a clearance between the channel sides of the equalizing yokes and the channel sides of the parts of end posts including posts 166 and 172.

The equalizing yoke of the yoke construction 16 thereafter is received by the posts 110 and 112 (the equalizing yoke of yoke construction 14 is similarly received) and moved into the disposition as in FIG. 8 so that the blocks 138 and 140 abut the ends of the lading 54. To this end, movement of screw 96 will impart movement to the equalizing yoke as limited by the spacing between the channel sides of posts 110 and 112.

The yoke constructions provide support for the lading and prevent end-to-end movement during transit. The support of the lading in the discussed direction is accomplished by the several blocks which cooperate with the lading at approximately the quarter points of the vertical edges. The end blocks of the yoke constructions 14 and 16 once located are locked in position by a gravity keeper or the equivalent attached to the wheel 98. An unequal end thrust is prevented from being applied unequally to either the upper or lower blocks. The localized pressure which would otherwise damage the lading is negated and the blocks restrain movement.

The hook structure 66 and 68 provides lateral restraint of the lading 54 when in cooperative engagement with the bars 56 and 58. The nature of cooperation is illustrated to best advantage in FIG. 6. The structure includes a pair of plates 210 and 212 for supporting the fingers 214 and 216, respectively, on the side of the bars 56 and 58 facing the frame. Each plate is supported at the outer extreme of each block 198 and 200 (and block 194 and 196) as indicated by the arrows. Each plate may include an end flange such as the flanges 218 and 220, within a region approximately limited by plate projections beyond the bars 56 and 58. To this end, the blocks are capable of abutting directly on the lading 54 and equalizing movement will be transmitted to the bars. A further plate, such as the L-shaped plate 222, 224 secures the bars 56 and 58 to the plates 210 and 212.

A further form of lateral securement of lading on a frame is illustrated in FIG. 9. In this form, securement of lading in the lateral direction is carried out by structure including a plurality of members arranged in parallel and disposed in substantial vertical orientation together with means for securing the vertical members between the frame at one end and the deck of the railway car at the other end.

Particularly, the vertical members include a plurality of I-beams 240 equal in number to the number of posts 24 in each frame 20 and 22. The I-beams 240 are of a length substantially equal to the width of the lading. For reasons that will become apparent, a slot 242 is cut or otherwise formed in the sides and across the web of each I-beam. The cut is in the plane of the connecting web and at the end of the I-beam which is secured to the frame.

A saddle member 244 serves to support each of the I-beams on the deck of the railway in position juxtaposed to the lading. The saddle member includes a plurality of angle elements 246, 248 and 250. As illustrated, the angle elements 246 and 248 are connected to the underside of the shelf of angle element 250. The members are connected in a manner to provide an opening therethrough. The height of the opening and the spacing of the legs is sufficient to accommodate the blocks 42 and 44 when the saddle member is received thereover. The center I-beams may be supported in similar fashion. The angle element 250 of each saddle member is secured to the I-beam. To this end, the base of each I-beam 240 is supported on a shelf of angle element 250, the angle element being disposed on the side of the I-beam toward the frame, so that that I-beam side is adjacent to the upstanding wall. Securement may be provided in the region of the side and wall, such as by welding.

A further angle element 252 is carried on the other side of each I-beam 240. The angle element 252 likewise may be welded to the respective I-beams at a height spaced from the end.

As will be discussed, each of the I-beams 240 are adjustable relative to the frames 20 and 22 to accommodate lading including racks of differing numbers of packs of lights.

Adjustment of the I-beams at the deck end is accomplished by means of the saddle member 244 which is movable along the length of block 42 (and 44) toward and away from an angle element 254 which is secured as by welding to the deck 12. The angle element includes an elongated upstanding wall 256 which is supported by a gusset 258.

In the present form of lateral securement the blocks 42 and 44 are designed to extend throughout a greater distance below the lading. In the FIG. 9 form each block 42 and 44 extends from the frame block 50 and abuts against the back of the upstanding wall 256. The blocks 42 and 44 are anchored against lateral movement by a pair of side angle elements 260 and 262. These angle elements similarly are welded to the deck 12.

A plurality, for example, of three custom cut-to-length wood filler blocks 264, 266 and 268 determine the spacing between the saddle member 244 and the angle element 254. The wood filler blocks are formed of 6/4 inch stock and stacked on the blocks 42 and 44. The respective blocks 42 and 44 preferably are of wider stock than are the wood filler blocks. The wood filler blocks are received between the blocks 42 and 44 and the angle element 252. Endwise movement is restrained by the I-beams 240 at one end and the angle element 254 at the other end. As illustrated, both the angle elements 252 and 254 have a pair of spaced nail holes formed in one wall. Duplex nails 270 may be received through the holes and into the blocks to further restrain movement.

Idler blocks 272 of substantially the same width, for example 10 inches, as the blocks 42 and 44 may be employed to add to the foot support for the lading. The idler blocks are of a length to traverse the width of the lading.

The I-beams 240 are received adjacent the outer face of the lading to provide lateral securement. Cushioning of each I-beam on the lading may be accomplished by means of a plurality of individual caps formed by channel members 274 and 276. Each cap carries a cushioning pad 278 on the face opposed from the base of the channel. The cushioning pad may be formed in a manner similar to that of the belting 52. Each leg of the caps 274 and 276 may be welded or otherwise permanently secured at equidistant spacing along the length of the I-beams. Blocks such as blocks 60 and 62 could be used with equal facility.

An eye 280 permits the I-beams to be manipulated by hoisting equipment both to place and remove it from restraining position. The eye is disposed at a position on the I-beams so that it will hang at an angle of inclination of about 4° during movement.

The I-beams also are capable of adjustment toward and away from the frame at the other end. To this end, a member 282 including a plate 284 is supported on the upper spacer 30. A pair of angle elements 286 and 288 are received on the underside of the plate in a manner so that one leg of each is disposed to provide a channel. Thus, the angle elements are received alongside the spacer and welded or otherwise secured in position. A further pair of angle elements 290 and 292 are welded or otherwise secured to the top surface of the plate 284. The angle elements are disposed in a manner that one wall of each leg faces the other providing a spacing therebetween relatively smaller than the spacing of the legs of angle elements 286 and 288. An aperture is formed in each wall.

A tie rod 294 having an eye 296 at one end and a threaded length at the other provides adjustment capability. To this end, the eye 296 is received between the walls of angle elements 290 and 292. The eye is secured by bolt 298 and the nut and washer 300.

A further pair of angle elements 302 and 304 cooperate with the I-beam 240 for securement of the tie rod at the threaded end. Each of the angle elements 302 and 304 provides a relieved area in one wall at both the front and rear. The relieved area 306 at the front is of greater depth than is the relieved area 308 at the rear. Both angle elements are welded or otherwise secured in place at the top of the I-beam. The unrelieved walls span the space between the walls of the I-beam and the relieved walls reside in a position coplanar to the edges of the slot 242.

A square washer 310 is supported by the web of the I-beam and restrained from movement within the front relieved areas. In assembly, the threaded end of the tie rod is passed through the washer. Securement is obtained by means of a nut and washer 312 which may be tightened down on the tie rod 294.

Consideration, as by providing a slight inclination of structure, such as the upstanding wall of angle element 250, the lengths of the various stacked filler blocks 264, 266 and 268, should be taken in view of the fact that, like the lading 54, the I-beams 240 are inclined at an angle of about 4° to the vertical.

While the lading 54 is restrained in end-to-end movement by the yoke constructions, and restrained in the sidewise direction by the forms of lateral securement of FIGS. 4 and 9, the lading may undergo some movement about the fulcrum points 136, for example. The amount of movement is limited by the clearance of the equalizing yokes within the opening between the spaced sides of the constraining posts 110 and 112, for example. Thus, the lading 54 is supported although not rigidly during transit. The support has been found to enable with good results of lading of the type described herein in an uncrated condition.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

Having thus described the invention, what is claimed is:

1. In combination with a carrier, an apparatus for substantially immovably supporting lading in uncrated condition for transport by said carrier comprising a frame member adapted to receive and maintain said lading in a generally upright orientation; means cooperable with said frame for preventing movement of said lading in a first direction; means carried by said frame member and said cooperable means for cushioning said lading; restraining means disposed at opposite ends of said frame, each of said restraining means including fulcrum means, a pair of stanchions extending to a height below said fulcrum means, each said pair of stanchions being defined by a first channel member; equalizing means for bearing at spaced locations at opposite ends of said lading to substantially prevent movement of said lading in a second direction; and means movably mounting said equalizing means on said restraining means, each of said frame and restraining means being mounted on said carrier and said mounting means including second channel members, the channel of each of said second members being of a dimension different than that of said first members, said second members being carried by said equalizing means for intercooperation with said first members, and a web member, said web member mounted between said stanchions to provide off-center support of said equalizing means, said support permitting greater freedom of movement of said equalizing means within the limit of movement defined by said channels about said fulcrum.

2. In combination with a carrier, an apparatus for substantially immovably supporting lading in uncrated condition for transport by said carrier comprising a frame member adapted to receive and maintain said lading in a generally upright orientation; means cooperable with said frame for preventing movement of said lading in a first direction; means carried by said frame member and said cooperable means for cushioning said lading; restraining means disposed at opposite ends of said frame; equalizing means for bearing at spaced locations at opposite ends of said lading to substantially prevent movement of said lading in a second direction; and means movably mounting said equalizing means on said restraining means, each of said frame and restraining means being mounted on said carrier and each of said restraining means including fulcrum means, means supporting said fulcrum means on one side of and for intercooperation with said equalizing means, a plurality of pad elements, and means mounting said pad elements in vertical spaced relation to said fulcrum means and on the other side of said equalizing means, said pad elements bearing on said opposite ends of said lading.

3. In combination with a carrier, an apparatus for substantially immovably supporting lading in uncrated condition for transport by said carrier comprising a frame member adapted to receive and maintain said lading in a generally upright orientation; means cooperable with said frame for preventing movement of said lading in a first direction, said cooperable means including a plurality of retaining bars, said retaining bars disposed in parallel spaced and substantially vertical orientation, said retaining bars being received in juxtaposed relation and cooperable with the other side of said lading, and adjustable means cooperable with each end of said retaining bars for positioning said retaining bars relative to said frame to accommodate lading of varying thickness, said adjustable means at one end of each said retaining bar including a first fixed member, said first fixed member spaced from and in the plane of each said retaining bar, a second fixed member, said second fixed member supported by each said retaining bar on the side of said first fixed member and above the end, said fixed members adapted to receive spacer members of a length determined by the thickness of said lading therebetween; means carried by said frame member and said cooperable means for cushioning said lading; restraining means disposed at opposite ends of said frame; equalizing means for bearing at spaced locations at opposite ends of said lading to substantially prevent movement of said lading in a second direction; and means movably mounting said equalizing means on said restraining means, each of said frame and restraining means being mounted on said carrier and said frame member including a plurality of elongated support members, said support members positioned laterally of and at an angle to a vertical plane between said restraining means, said plane defining the center line of said carrier, one side of said lading being in substantial juxtaposition along said support members.

4. In combination with a carrier, an apparatus for substantially immovably supporting lading in uncrated condition for transport by said carrier comprising a frame member adapted to receive and maintain said lading in a generally upright orientation; means cooperable with said frame for preventing movement of said lading in a first direction, said cooperable means including a plurality of retaining bars, said retaining bars disposed in parallel spaced and substantially vertical orientation, said retaining bars being received in juxtaposed relation and cooperable with the other side of said lading, and adjustable means cooperable with each end of said retaining bars for positioning said retaining bars relative to said frame to accommodate lading of varying thickness, said adjustable means at the other end of each said retaining bar including a tie rod, means for pivotally mounting said tie rod at one end to said frame, and each said retaining bar at said other end having means cooperating with for adjustable securement of the other end of said tie rod; means carried by said frame member and said cooperable means for cushioning said lading; restraining means disposed at opposite ends of said frame; equalizing means for bearing at spaced locations at opposite ends of said lading to substantially prevent movement of said lading in a second direction; and means movably mounting said equalizing means on said restraining means, each of said frame and restraining means being mounted on said carrier and said frame member including a plurality of elongated support members, said support members positioned laterally of and at an angle to a vertical plane between said restraining means, said plane defining the center line of said carrier, one side of said lading being in substantial juxtaposition along said support members.

5. The combination of claim 4 wherein said tie rod at said other end is threaded and said means at the other end of each said retaining bar includes a slot directed toward said frame, an apertured washer, means for locating said washer within said slot for receipt therethrough of the other end of said tie rod, and means cooperating with a wall of each said retaining bar at the end of said slot and with said tie rod for threaded adjustment.

* * * * *

UNITED STATES PATENT AND TRADEMARK OFFICE
CERTIFICATE OF CORRECTION

PATENT NO. : 3,921,538
DATED : November 25, 1975
INVENTOR(S) : Albert J. Bundy

It is certified that error appears in the above-identified patent and that said Letters Patent are hereby corrected as shown below:

Column 8, line 3, "parts" should be --pairs--.

Signed and Sealed this fourth Day of May 1976

[SEAL]

Attest:

RUTH C. MASON
*Attesting Officer*

C. MARSHALL DANN
*Commissioner of Patents and Trademarks*